United States Patent [19]

Cohen

[11] Patent Number: 4,898,192
[45] Date of Patent: Feb. 6, 1990

[54] HOLOGRAPHIC FALSE NAILS

[76] Inventor: Allen L. Cohen, 10010 Walsham Ct., Richmond, Va. 23233

[21] Appl. No.: 256,582

[22] Filed: Oct. 12, 1988

[51] Int. Cl.⁴ ............................................. A45D 29/00
[52] U.S. Cl. ..................................................... 132/73
[58] Field of Search .................. 132/73, 73.5; 350/3.6, 350/3.7, 162.18

[56] References Cited

U.S. PATENT DOCUMENTS

| 2,746,460 | 5/1956 | Jellinek | 132/73 |
| 2,816,555 | 12/1957 | Klump | 132/73 |
| 2,864,384 | 12/1958 | Walter | 132/73 |
| 3,898,357 | 8/1975 | Miller et al. | 132/73 |
| 4,581,088 | 4/1986 | House | 63/2 |
| 4,751,935 | 6/1988 | Mast et al. | 132/73 |

FOREIGN PATENT DOCUMENTS 288714 11/1988 European Pat. Off. .............. 132/73

*Primary Examiner*—Gene Mancene
*Assistant Examiner*—Michael Lynch

[57] ABSTRACT

An artifical fingernail or toenail which can provide the illusion of length together with a varying color pattern, through the use of a three dimensional holographic image.

7 Claims, 5 Drawing Sheets

HOLOGRAPHIC FALSE NAILS

BRIEF DESCRIPTION OF THE INVENTION

An artificial fingernail or toenail to be used for cosmetic purposes, the artificial nail comprising a cosmetic portion and a nail body. The cosmetic portion comprises a holographic means for achieving a desired cosmetic effect, while the nail body acts both as a substrate for the holographic means as well as a mechanism for securing the artificial nail to the wearers natural nail. This invention achieves the desirable look of long nails by use of shorter and more convenient artificial nails.

BACKGROUND TO THE INVENTION

In many societies long fingernails are considered to be cosmetically desirable. However, in order to achieve this cosmetic look, one has to resort to either growing a long set of nails or, alternatively, using artificial fingernails, typically made of plastic materials. With either of these alternatives, while such long fingernails may be cosmetically attractive, they nevertheless pose a number of disadvantages to the wearer. Many people who wear false nails find them to be most uncomfortable because they sense the artificiality of the false nail which creates an insecurity in the wearing of them. The wearers also find false nails to be unnatural extensions of their regular nails consequently the false nails interfere in daily activities.

Significantly, long fingernails can be a physical handicap in a number of daily activities, such as typing, installing contact lenses, telephone dialing, playing sports, putting on sheer stockings, conventional housework, and the like. In addition, such long nails also present the problem of being prone to chipping, cracking, breaking, and other damage due to their length and their susceptibleness to being banged and bumped during a normal day's activities. When using an artificial long nail, such daily activities generally tend to, at the very least, loosen the artificial nail from the wearer's natural nail.

Still further, there are a wide variety of plastic false finger and toenails currently available. Those that are long in length, "glamour length" styles, will suffer from the above disadvantages. On the other hand, those that are somewhat shorter in length, for the "active wearer," while providing a more practical length, will of course not provide the cosmetic look of the desirably longer length nails.

These artificial nails either come colorless and are meant to be covered with a nail polish or are provided with a color thereby eliminating the need for such post polishing. As with a natural nail, a design or appliqué may be applied to the colored artificial nail. Most significantly, such a design or appliqué and, clearly, a nail that is simply colored, merely provides a constant, nonchanging image to the observer of the nail regardless of the observer's position with respect to the nail. No matter which way the nail is turned, the overall effect to the observer remains constant.

THE INVENTION

The invention comprises a cosmetic false nail containing a visually viewable cosmetic pattern comprising a holographic image.

The invention comprises a cosmetic false nail containing a visually viewable cosmetic pattern comprising a reflection hologram, said reflection hologram forming an image or color pattern, and being arranged to afford a substantially unimpeded view of said image or color pattern.

The invention relates to false nails which contain a planar holographic element, said holographic element being a reflection hologram that generates a three dimensional image or color pattern. One embodiment of the invention, provides for the holographic element to comprise a volume reflection hologram. Said volume reflection hologram, may be in the form of thick film emulsion comprising a planar element affixed to a carrier body designed to fit a natural fingernail or toenail; and most desirably said reflection hologram element covered by a transparent protective layer.

The holographic effect may be used to give a shimmering or floating image with movement and depth by virtue of its three dimensional nature. This phenomenon of movement and depth can achieve startling visual effects. Moreover, the combination of motion, depth, and parallax that is provided by the holographic image provides a constantly changing, aesthetically pleasing pattern to the observer. The appearance achieved is unique.

In a preferred embodiment of the present invention, the holographic element is a surface relief reflection hologram comprising a reflective film, said reflective film being sandwiched between an outer transparent protective layer and an inner nail body portion designed to fit a natural fingernail or toenail.

The present invention encompasses an artificial nail comprising in a visually observable area thereof;
 a. a carrier body designed to fit a natural fingernail or toenail; and,
 b. a hologram means comprising a planar member disposed on or within said carrier body.

DESCRIPTION OF THE PREFERRED EMBODIMENTS

The invention relates to a new artificial finger and toenail which eliminates or substantially reduces the disadvantages and problems associated with prior art artificial nails. More particularly, the invention is directed to an artificial nail which achieves the desirable look of long nails although the artificial nail itself has an advantageously shorter, more practical length. Moreover, this illusion of length is also accompanied by an ever constantly changing, aesthetically pleasing three dimensional image and/or changing color pattern.

Specifically, Applicant is able to accomplish the above by providing an artificial fingernail or toenail which produces a three dimensional image or color pattern. This three dimensional image is obtained by utilizing a reflection hologram in the form of a planar element that is affixed to an artificial nail body. The illusion of depth when used in conjunction with an artificial fingernail, can effectively mimic the appearance of long fingernails. As long as the illusion of depth exhibits perspective and parallax the appearance will be similar to that of physically longer artifical fingernails.

The three dimensional imagery gives rise to a shimmering illusion with depth. In addition, parallax inherent in the three dimensional image gives an added illusion of movement. Moreover, the use of a holographic element to provide the image, will result in a color pattern that is ever varying as the viewing angle is changed. The resulting three dimensional effect is seen as striking and unusual color patterns appearing both natural and lifelike.

Assuming, for arguments sake, that it was logical to those in the art to want to effect an apparent increase in the length of artificial nails in order to enhance their cosmetic appearance, until this invention, there was no reasonable way to continue to extend their apparent length without increasing their actual physical length and thereby adversely affecting their usefulness.

The property of a holographic image, that is crucial to this invention is that it presents an image that is three dimensional. The image can be adjusted to appear floating above or below the artificial nail body, it can have a three dimensional thickness that encompasses the nail body, etc. As described in more detail below, a hologram is made in two or more stages. The first stage involves the creation of an interference fringe pattern between some pattern or object and a monochromatic reference beam. This results in a transparent colorless image comprising a set of interference fringes that bear no visual resemblance to the actual pattern or object. After further processing, a reflection hologram is formed, such that when it is viewed, there will appear to the viewer a three dimensional image that corresponds to the original pattern or object.

Figure 2:
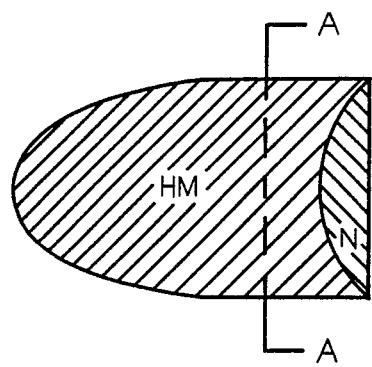
FIG. 2 shows a top view of an artificial fingernail or toenail with a hologram means covering a portion of its surface.
Figure 1:
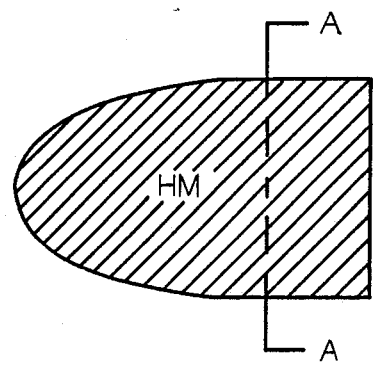
FIG. 1 shows a top view of an articial fingernail or toenail with a hologram means covering its entire surface.

In FIG. 1 we see a top view of an artificial fingernail or toenail with a holographic planar element HM covering its entire surface. A cross-sectional cutting plane is shown in FIG. 1 as AA. In FIG. 2 we see a top view of an artificial fingernail or toenail with a holographic planar element HM covering a portion of its surface, that portion of the nail surface not covered by the holographic means is labeled N. We also show in FIG. 2 the same cross-sectional cutting plane AA as shown in FIG. 1.

Figure 3:
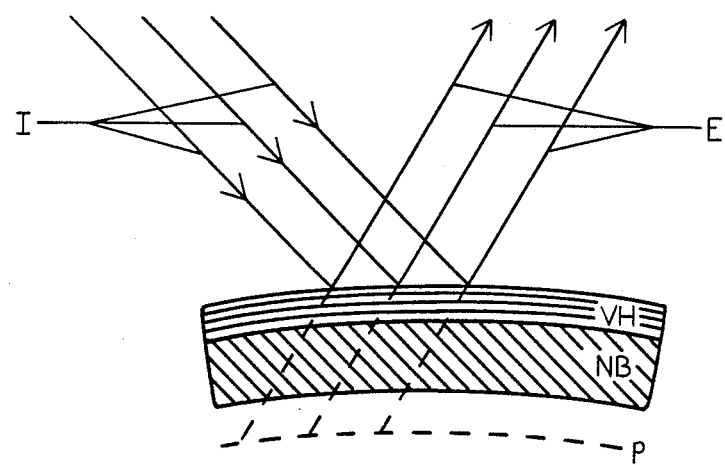
FIG. 3 shows a cross-sectional view, taken generally along line A—A of FIGS. 1 or 2, of a portion of an artificial fingernail or toenail with a holographic mirror forming the top surface.

In the embodiment of the invention as shown in FIG. 3, we have for purposes of illustration, the cross-sectional view indicated as AA in the FIGS. 1 & 2. The nail body NB acts as a carrier body and is designed to fit a natural nail, and further comprises a means for securing said nail body to a natural nail. This embodiment has a 'volume reflection hologram' VH covering part of its top surface.

A volume reflection hologram is also known as a holographic mirror because it strongly reflects light near a particular design wavelength. In the case of the embodiment of FIG. 3, the effect will be such as to impart to the fingernail or toenail a color close to that of the monochromatic reference beam used in manufacturing the holographic mirror.

Figure 4:
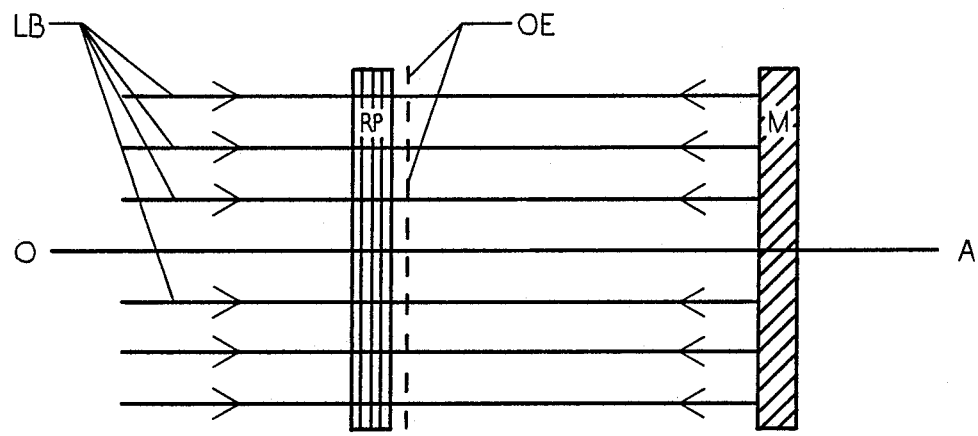
FIG. 4 shows an optical bench arrangement used to create a volume reflection hologram.

FIG. 4 illustrates a typical optical bench arrangement employed in producing a holographic mirror. In this arrangement we see a collimated monochromatic reference beam LB traveling along an optical axis OA, and passing through a thick film emulsion or recording plate RP used for recording the hologram. The recording plate may comprise dichromated gelatin (U.S. Pat. No. 3,617,274), DMP-128 (U.S. Pat. No. 4,588,666), or any other suitable recording material. Behind the recording plate RP there may be placed, but not necessarily, an obscuring element OE. The collimated monochromatic reference beam LB will pass through the obscuring element OE, strike the mirror M and be reflected back upon itself. This arrangement sets up a standing wave that forms within the recording plate RP a set of conformal fringe planes.

The next stage involves a development process such that the resulting refractive index of the emulsion film will vary according to the pattern of the fringe planes. The result is a holographic mirror that will strongly reflect light at wavelengths close to the wavelength of the monochromatic reference beam LB.

The wavelength dependence of the holographic mirror imparts an important cosmetic effect. Naturally, the artificial nails will take on the color of these refelcted wavelengths. The basic colors are obviously determined by the colors of the laser beams used to expose the recording plate RP. The bandwidth of the reflected light may be controlled by the material of the recording plate RP and the development process, being narrow when the volume reflection hologram is thick, and vice versa.

If the obscuring element OE is removed, the developed recording plate RP will be a non-image bearing hologram. While the obscuring element OE is not necessary, it may be used to advantage by creating an image bearing holographic mirror which will give both a depth and random or patterned image to the reflected light.

Again looking at FIG. 13 we see a set of light rays I incident upon the holographic mirror portion of the artificial nail. Some of these rays, namely those close to the desired color will be reflected as the exit rays E, the other wavelengths being absorbed by the artificial nail body. These exit rays will not only be of the desired color, but they will appear to emanate from an image plane P which may be chosen arbitrarily, but generally slightly above or below the nail body. In FIG. 3 it is shown as being below the nail body. The location of this image plane P is determined by the location of the obscuring element OE in the optical set up used in making the holographic mirror.

It should be realized that not only can the obscuring element OE be removed from the system, but it may also be replaced with a diffuse or spectrally reflecting object to produce a 'Denisyuk' volume reflection hologram. This will of course produce many interesting and unusual visual effects that may enhance the appearance of the nails.

And it should be still further understood that the recording plate RP may be inclined to the optical axis so as to produce a volume reflection hologram with slanted or skewed fringes.

Finally, it must be mentioned that the volume reflection hologram need not be on the front surface of the artificial nail, but may be upon the back surface, or even imbedded within the artificial nail itself. In these embodiments of course, the portion of the artificial nail body covering the upper surface of the holographic element, must comprise a tranparent material so that the holographic mirror may be viewed from above the nail itself.

Figure 5:
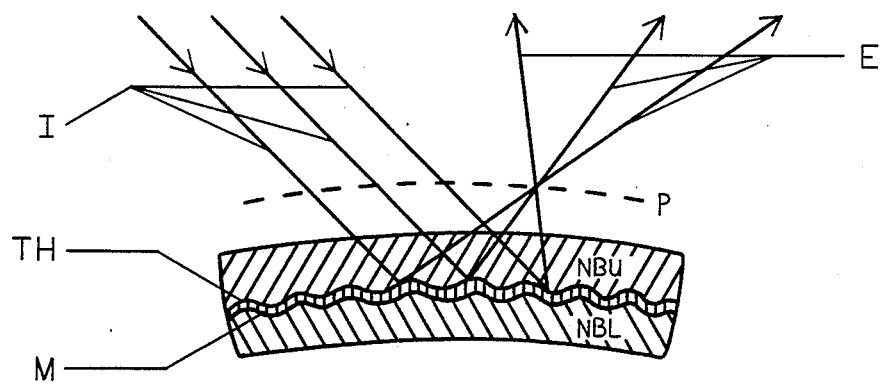
FIG. 5 shows a cross-sectional view of a portion of an artificial fingernail or toenail with a surface relief reflection hologram forming the center of its nail body.

In the embodiment of the invention as shown in FIG. 5, we have for purposes of illustration, the cross-sectional view indicated as A—A in FIGS. 1 & 2. The lower nail body NBL acts as a carrier body and is designed to fit the nail of the wearer. The upper nail body NBU acts as a protective cover for the enclosed hologram means TH. In this embodiment, the hologram means is a 'surface relief reflection hologram' TH sandwiched between the upper and lower bodies. A reflection hologram functions when it reflects light. In the embodiment of FIG. 4, this is accomplished by applying a reflective coating M to the back surface of a surface relief transmission hologram thereby creating a surface relief reflection hologram.

Figure 6:
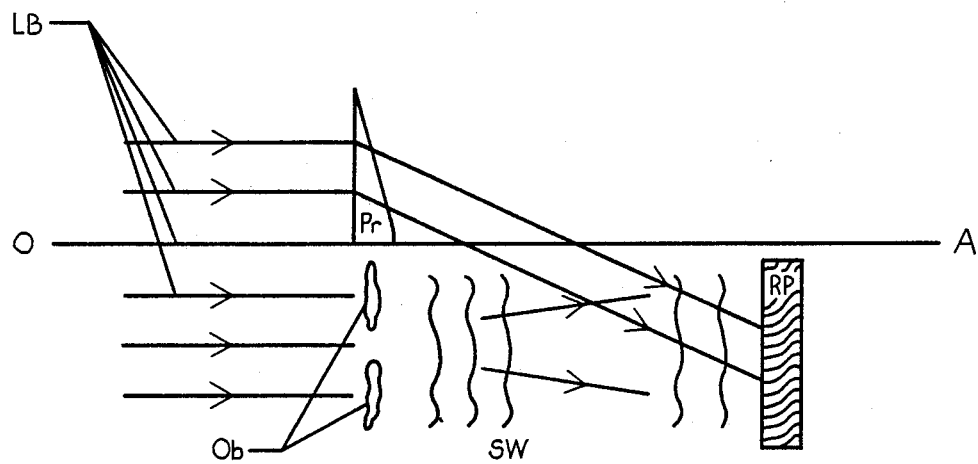
FIG. 6 shows an optical bench arrangement used to create a surface relief reflection hologram.

The most commonly used transmission hologram is the 'Leith-Upatnieks' or 'off-axis' hologram. FIG. 6 illustrates a typical optical bench arrangement employed in producing an off-axis transmission hologram. In this arrangement we see a collimated monochromatic reference beam LB traveling along an optical axis OA. A portion of the monochromatic reference beam LB passes through a prism Pr and is deviated toward a photosensitive emulsion or recording plate RP. Another portion of the reference beam LB is incident upon the object Ob, which is taken to be a transparency, and a scattered wave front SW proceeds toward the recording plate RP. This arrangement sets up interference fringes within the recording plate RP. Upon development and etching, we will have a surface relief transmission hologram that will produce a three dimensional image of the recorded object when it is suitably illuminated.

If the object has a high enough transmittance, the prism Pr may be removed from the optical arrangement and we will record a 'Gabor' or 'on-axis' hologram. It should be realized that we may also consider just such an on-axis transmission hologram for the embodiment of FIG. 5.

To make the artificial nail of FIG. 5, we might start with the lower nail body portion NBL and using a master mold of the surface relief transmission hologram press the necessary surface relief geometry unto the top surface of the lower nail body portion NBL. The bottom surface of said lower nail body portion NBL, substantially conforms to the curvature of a natural nail and further comprises a means for seuring said artificial nail to a natural nail. Said securing means may comprise either a pressure sensitive adhesive layer or a liquid adhesive. Then the area of surface relief could be coated with a reflective film. Finally, we would cover the reflective film with a protective upper nail body portion NBU.

The embodiment of FIG. 5 works in similar fashion as does the embodiment of FIG. 3, except that in this case we are making use of a surface relief reflection hologram. Again looking at FIG. 5 we see a set of light rays I incident upon the holographic portion of the artificial nail. Because of the mirrored film M, these rays will be reflected back as the exit rays E. These exit rays will exhibit a wide variation in color as the viewing angle is changed. Furthermore, they will appear to emanate from an image plane P which may be chosen to be slightly above or below, or even in, the plane of the nail body. In FIG. 5 the image plane is shown as being above the nail body. The location of this image plane P is determined by the location of the recorded object Ob in the optical set up used in making the holographic element.

It should be appreciated that the invention is not limited to the exact details of construction shown and decribed herein for many obvious modifications will occur to persons skilled in the art.

What is claimed is:
1. An artificial fingernail which comprises:
   (a) a carrier nail body with a top surface and a bottom surface, said carrier nail body contoured to fit onto a natural fingernail; and wherein
   (b) the bottom surface has means for securing said artificial fingernail to the natural fingernail; and
   (c) a hologram is affixed to and covering at least a part of the top surface of said carrier nail body, whereby said hologram functions to create an image that has three dimensional depth.
2. The artificial fingernail of claim 1, further comprising a transparent protective coating that is affixed to and covers at least part of the hologram.
3. The artificial fingernail of claim 1 wherein said hologram is a volume reflection hologram.
4. The artificial fingernail of claim 1, wherein said hologram is a surface relief reflection hologram.
5. An artificial fingernail comprising:
   (a) a transparent carrier nail body having a bottom surface; and
   (b) a hologram in the form of a thin film, affixed to, and substantially conforming to, at least a part of the bottom surface of said carrier nail body; and
   (c) means for securing said artificial fingernail to a natural fingernail.
6. The artificial fingernail of claim 5, wherein said hologram is a volume reflection hologram.
7. The artificial fingernail of claim 5, wherein said hologram is a surface relief reflection hologram.

* * * * *